(12) United States Patent
Kolpien

(10) Patent No.: US 7,568,707 B2
(45) Date of Patent: Aug. 4, 2009

(54) COVER FOR A MOBILE PUSH CART HANDLE AND METHODS THEREOF

(76) Inventor: Lori Kolpien, 7091 Wolf Rivers Ave., Las Vegas, NV (US) 89131

( * ) Notice: Subject to any disclaimer, the term of this patent is extended or adjusted under 35 U.S.C. 154(b) by 93 days.

(21) Appl. No.: 11/540,429

(22) Filed: Sep. 29, 2006

(65) Prior Publication Data

US 2007/0069489 A1    Mar. 29, 2007

Related U.S. Application Data

(60) Provisional application No. 60/721,306, filed on Sep. 29, 2005.

(51) Int. Cl.
    *B62B 5/00*    (2006.01)
(52) U.S. Cl. .................. 280/33.992; 224/409
(58) Field of Classification Search ............ 280/33.992; 224/409
    See application file for complete search history.

(56) References Cited

U.S. PATENT DOCUMENTS

| | | | |
|---|---|---|---|
| 2,803,849 A * | 8/1957 | Peters ..................... 16/421 |
| 4,512,504 A * | 4/1985 | Owlett ..................... 224/572 |
| 4,805,937 A * | 2/1989 | Boucher et al. ........ 280/33.992 |
| 4,881,746 A * | 11/1989 | Andreesen ............ 280/33.992 |
| 4,955,914 A * | 9/1990 | Caniglia et al. ............ 606/235 |
| 5,004,252 A * | 4/1991 | Kraper .................. 280/33.992 |
| 5,215,319 A * | 6/1993 | Farris .................... 280/33.992 |
| 5,427,392 A * | 6/1995 | Duer ..................... 280/33.992 |
| 5,429,377 A * | 7/1995 | Duer ..................... 280/33.992 |
| 5,678,888 A | 10/1997 | Sowell et al. |
| 5,715,571 A * | 2/1998 | Fasano ...................... 16/436 |
| 5,722,672 A * | 3/1998 | Frederick ............... 280/33.992 |
| 5,772,672 A | 6/1998 | Toy et al. |
| 5,820,142 A * | 10/1998 | Duer ..................... 280/33.992 |
| 5,953,790 A * | 9/1999 | Auxier ....................... 16/436 |
| 6,065,764 A | 5/2000 | Moseley |
| 6,453,588 B1 * | 9/2002 | Lykens ..................... 40/308 |
| 6,543,794 B1 | 4/2003 | Tyree |
| 6,817,066 B1 * | 11/2004 | Williams et al. ............ 16/435 |
| 6,848,743 B1 | 2/2005 | Collins |
| 6,869,085 B2 * | 3/2005 | Pettigrew et al. ........ 280/33.992 |
| 6,981,707 B1 * | 1/2006 | Dandy .................... 280/33.992 |
| 7,163,211 B2 * | 1/2007 | Alvarez ................. 280/33.992 |
| 7,281,718 B2 * | 10/2007 | Malchow ............... 280/33.992 |
| 2002/0000700 A1 * | 1/2002 | Alexsen et al. ......... 280/33.992 |
| 2002/0050085 A1 * | 5/2002 | Durham .................. 40/661.12 |
| 2003/0155727 A1 * | 8/2003 | Pettigrew et al. ........ 280/33.992 |
| 2004/0021279 A1 * | 2/2004 | Sobo et al. ............ 280/33.992 |
| 2004/0080129 A1 * | 4/2004 | Myers et al. ........... 280/33.992 |

(Continued)

*Primary Examiner*—Jeffrey J Restifo
(74) *Attorney, Agent, or Firm*—James Ray & Assoc.

(57) ABSTRACT

The present invention provides a method of sanitizing a handle on a mobile push cart which includes the steps of positioning, in at least one preselected location, a storage container capable of holding a predetermined plurality of covers, obtaining, from the storage container one cover and detachably positioning the cover onto the handle of the mobile push cart. The invention also provides a method of advertising product or event in combination with the mobile push cart, wherein advertising information is provided on the cover which is detachably positioned onto the handle of the mobile push cart. The invention additionally provides a novel protective cover for the mobile push cart which includes provisions for supporting various accessories usable in a supermarket and the like.

8 Claims, 1 Drawing Sheet

U.S. PATENT DOCUMENTS

| | | | |
|---|---|---|---|
| 2005/0028637 A1* | 2/2005 | Coty | 74/551.9 |
| 2005/0039303 A1 | 2/2005 | Johnson | |
| 2005/0199667 A1* | 9/2005 | Cappellino et al. | 224/411 |
| 2005/0206104 A1* | 9/2005 | Pettigrew et al. | 280/33.992 |
| 2005/0218612 A1* | 10/2005 | Malchow | 280/33.992 |
| 2006/0076743 A1* | 4/2006 | Dunser | 280/33.992 |
| 2006/0082085 A1* | 4/2006 | Alvarez | 280/33.992 |
| 2006/0202438 A1* | 9/2006 | Helmy et al. | 280/33.992 |
| 2006/0226614 A1* | 10/2006 | Brilliant et al. | 280/33.992 |
| 2006/0267299 A1* | 11/2006 | Dunser | 280/33.992 |
| 2007/0126193 A1* | 6/2007 | Hess | 280/33.992 |
| 2007/0267828 A1* | 11/2007 | Egizi | 280/33.992 |
| 2008/0001371 A1* | 1/2008 | Rabiea | 280/33.992 |

* cited by examiner

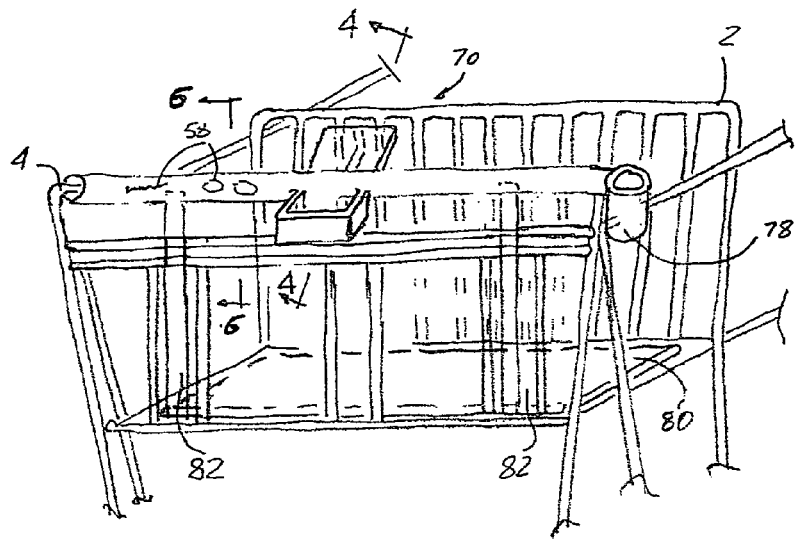
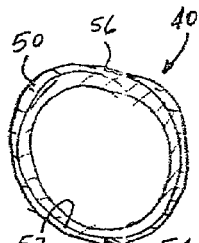
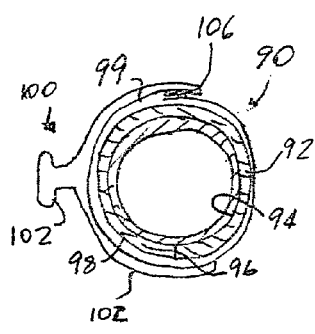
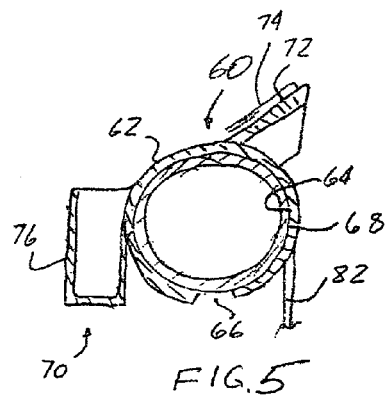
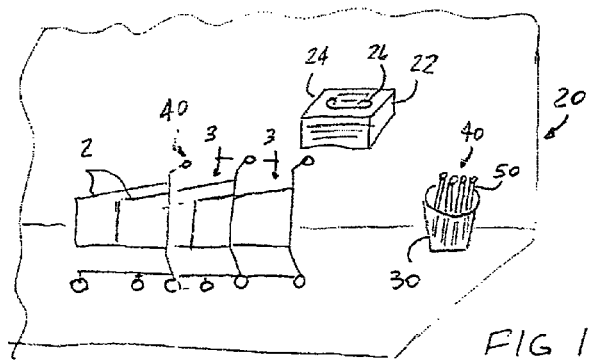
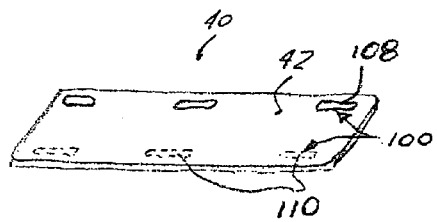

COVER FOR A MOBILE PUSH CART HANDLE AND METHODS THEREOF

CROSS-REFERENCE TO RELATED APPLICATIONS

This application is related to and claims priority from Provisional Patent Application Ser. No. 60/721,306 filed Sep. 29, 2005.

FIELD OF THE INVENTION

The present invention relates, in general, to covers for mobile push cart handles and, more particularly, this invention relates to a protective cover that provides insulation and comfort and also shields users from germs and dirt that may be found on handles of mobile push carts such as shopping carts, strollers, mail carts and the like and, yet more particularly, the instant invention provides novel methods of using such mobile cart handle cover.

BACKGROUND OF THE INVENTION

As is generally well known, germs, such as bacteria, human bodily fluid discharges and other skin-borne infectious elements accumulate on handles of the mobile push carts due to extensive use of such carts by various members of general public. Such unsanitary conditions are worrisome to many and, particularly, to parents of small children who are known to teeth and chew on the handle or place hands into their mouth after touching the handle.

Numerous efforts have been made to alleviate such unsanitary conditions by providing protective covers which are attachable to the handle, usually in a detachable fashion, to protect the user of such mobile push cart from direct contact with the handle. U.S. Pat. No. 5,722,672 issued to Frederick, U.S. Pat. No. 6,543,794 issued to Tyree and U.S. Pat. No. 6,065,764 issued to Moseley disclose various type of such protective covers. While the available prior art protective covers are suitable for providing sanitary conditions they failed to gain wide acceptance and use.

Furthermore, users of such mobile push carts and, particularly of the shopping cart type that are used in supermarkets and departments stored are inconvenienced by lack of provisions which allow such users to place a beverage, coupons and other items that such user needs and uses during shopping effort, particularly when the user spends prolong periods of time.

SUMMARY OF THE INVENTION

According to one embodiment, the invention provides a method of sanitizing a handle on a mobile push cart. The method includes the step of positioning, in at least one preselected location, a storage means capable of holding a predetermined plurality of covers. Then, obtaining, from the storage means one of the predetermined plurality of covers. Finally, detachably positioning the obtained cover onto the handle of the mobile push cart.

According to another embodiment of the invention, there is provided a cover for a handle on a mobile push cart. The cover includes an elongated member which is sized to cover such handle. A means which is attached to a predetermined portion of the elongated member is provided for supporting a predetermined accessory which is used by the user of such mobile push cart.

According to yet another embodiment, the invention provides a method of advertising at least one of a product and an event in combination with a mobile push cart. The method includes the steps of providing a cover for a handle on the mobile push cart. Then, providing a predetermined indicia onto the cover which characterizes the at least one of product and event. Finally, detachably positioning the provided cover onto the handle of the mobile push cart for viewing the provided predetermined indicia.

According to a further embodiment of the invention, there is provided a protective cover for a handle on at least one of a mobile push cart and a basket. The cover includes a tubular member which has each of a predetermined length and a predetermined material. An axial aperture extends between opposed ends of the tubular member and a longitudinal slit continuously extends from the aperture to an outer surface of the tubular member. The tubular member is detachably secured onto such handle by positioning the longitudinal slit adjacent such handle and exerting manual pressure onto the tubular member. The pressure causes a temporary deformation of the tubular member and enables the longitudinal aperture to encase such handle. A generally planar sheet of a preselected flexible material is then sized to completely cover the tubular member. Means is provided for detachably securing the planar sheet to the tubular member.

OBJECTS OF THE INVENTION

It is, therefore, one of the primary objects of the present invention to provide a cover for a handle on a mobile push cart.

Another object of the present invention is to provide a cover for a handle on a mobile push cart which provides insulation and comfort to the user of such mobile push cart.

Yet another object of the present invention is to provide a cover for a handle on a mobile push cart which shields the user from germs and dirt that may be found on the handle.

A further object of the present invention is to provide a cover for a handle on a mobile push cart which is inexpensive to manufacture.

Yet a further object of the present invention is to provide a cover for a handle on a mobile push cart which is simple to install.

An additional object of the present invention is to provide a method of sanitizing a handle on a mobile push cart.

Another object of the present invention is to provide a method of using the cover installed onto a handle of a mobile push cart for advertising products and events.

In addition to the several objects and advantages of the present invention which have been described with some degree of specificity above, various other objects and advantages of the invention will become more readily apparent to those persons who are skilled in the relevant art, particularly, when such description is taken in conjunction with the attached drawing Figures and with the appended claims.

BRIEF DESCRIPTION OF THE DRAWINGS

FIG. 1 is a perspective schematic view of a cover for a handle of a mobile push cart, particularly illustrating a method of providing such cover to the user;

FIG. 2 is a perspective view of the cover for the handle of the mobile push cart constructed according to one embodiment of the invention;

FIG. 3 is a cross-sectional view of the cover of FIG. 1;

FIG. 4 is a perspective view of the cover constructed according to another embodiment of the invention installed on a shopping cart, partially illustrated;

FIG. 5 is a cross-sectional view of the cover of FIG. 3; and

FIG. 6 is a cross-sectional view of the cover of FIG. 3, particularly illustrating means for securing the cover to the handle.

BRIEF DESCRIPTION OF THE VARIOUS EMBODIMENTS OF THE INVENTION

Prior to proceeding to the more detailed description of the present invention, it should be noted that, for the sake of clarity and understanding, identical components which have identical functions have been identified with identical reference numerals throughout the several views illustrated in the drawing figures.

It is to be understood that the definition of a mobile push cart includes but is not limited shopping cart, stroller, mail cart and the like.

According to a first embodiment, the present invention provides a method of sanitizing a handle 4 on a mobile push cart 2. Now in reference to FIGS. 1-3, the method includes the step of positioning, in at least one preselected location, a storage means, generally designated as 20, which is capable of holding a predetermined plurality of covers, generally designated as 40. The storage means 20 preferably includes a dispenser 22 for incrementally dispensing such predetermined plurality of covers 40. In combination with the dispenser 22, each cover 40 includes a planar sheet 42 of a flexible material which is sized to completely cover such handle 4 and means, generally designated as 100, for detachably securing the planar sheet 42 to the handle 4. The detail description of such attachment means 100 will be provided further in this document. The dispenser 22 may be of a first well known single sheet type wherein the dispenser 22 includes a simple hollow and closed housing 24 and a slot 26 formed in one surface of the housing 24 and wherein the plurality of planar sheets 42 are disposed within the housing 24 and are juxtaposed with each other. Or, the dispenser 22 may be of a second well known roll type (not shown) wherein the plurality of planar sheets 42 are connected to each other by way of perforations (not shown) in a roll fashion.

Alternatively, the storage means 20 may include a generally hollow receptacle 30 having a closed end and an opposed open end. Such hollow receptacle 30 is advantageous for storing plurality of covers 40 each pre-formed as a tubular member 50 having each of a predetermined length and a predetermined first material. Now in reference to FIG. 3, the tubular member 50 has an axial aperture 52 which extends between opposed ends of the tubular member 50 and a longitudinal slit 54 which continuously extends from the aperture 52 to an outer surface 56 of the tubular member 50. In such embodiment, the tubular member 50 is detachably secured onto such handle 4 by positioning the longitudinal slit 54 adjacent such handle 4 and exerting pressure onto the tubular member 50 causing a temporary deformation of the tubular member 50 and enabling the longitudinal aperture 52 to encase such handle 4. The material of such elongated member 52 is preferably a plastic including but not limited to vinyl, polyvinyl, polypropylene and polyethylene. It will be appreciated that the elongated member 52 will be well suited for providing a single use protective cover 50.

The method further includes the step of obtaining, from the storage means 20, one of the predetermined plurality of covers 40. Finally, the method contemplates detachably positioning the cover 40 onto the handle 4 of the mobile push cart 2.

As bets illustrated in FIG. 1, the storage means 20 is preferably positioned in a close proximity to stored mobile shopping carts 2 and are easily accessible by the users of such mobile push carts 2.

According to another embodiment of the invention, there is provided a method of advertising at least one of a product and event in combination with a mobile push cart 2. The method includes the step of providing the cover 40 for a handle 4 on such mobile push cart 2. Then, providing a predetermined indicia 58, being at least one of graphics and text, onto the cover 40 which characterizes the at least one of product and event. The indicia 58 may be printed onto the cover 40 or may be provided as a well known decal. Finally, the method includes the step of detachably positioning the cover 40 onto the handle 4 of the mobile push cart 2 for viewing the predetermined indicia 58 by the user of the mobile push cart 2. By way of one example, a supermarket personnel can select such indicia 58 to characterize a featured product offering which will be then in a direct view of the consumer entering such supermarket and using the mobile push cart 2 of a well known shopping cart type. By way of another example, amusement park personnel may select such indicia 58 to characterize a particular character or event. The visitor to such amusement park who rents the mobile push cart 2 of a child stroller type having the cover 40 positioned on the handle 4 will then have a direct view of such character or event. The amusement park personnel may also offer such covers 40 stored in the storage means 20 for use by visitors bringing their own strollers or as a souvenir for visitors to take with them when leaving the park. The amusement park personnel may elect to charge the visitor for such cover 40 or may elect to provide the cover 40 for free to the visitor. Accordingly, the method further includes the step of positioning, in at least one preselected location, the storage means 20 capable of holding a predetermined plurality of covers 40 as well as the step of obtaining, from the storage means 20, one of the predetermined plurality of covers 40.

According to yet another embodiment, the invention provides a novel cover 60 for the handle 4 on the mobile push cart 2. Now in reference to FIGS. 4-5, the cover 60 includes an tubular member 62 which is sized to cover such handle 4 and means, generally designated as 70, which is attached to a predetermined portion of the tubular member 62 for supporting at least one predetermined accessory. The tubular member 62 has an axial aperture 64 which extends between opposed ends of the tubular member 62 and a longitudinal slit 66 which continuously extends from the aperture 64 to an outer surface 68 of the tubular member 62. In such embodiment, the tubular member 62 is detachably secured onto such handle 4 by positioning the longitudinal slit 66 adjacent such handle 4 and exerting pressure onto the tubular member 62 causing a temporary deformation of the tubular member 62 and enabling the longitudinal aperture 64 to encase such handle 4. The longitudinal slit 66 has a predetermine width to enable ease of installation due to presence of such at least one accessory supporting means 70. Furthermore, the edge portions of the elongated member 62 which are disposed adjacent the longitudinal slit 66 may have a reduced thickness to further aid in installation of the cover 60 onto the handle 4.

Such accessory supporting means 70 may include a generally flat and rigid portion 72 for use as a writing surface. Additionally, the cover 60 may further include a pad of paper 74 which is affixed to the generally flat portion 72. Preferably, such generally flat portion 72 is positioned at a predetermined angle, bets shown in FIG. 5, for sake of convenience to the user when such cover 60 is positioned onto the handle 4.

Alternatively or in combination to such writing surface 72, the accessory supporting means 70 may include means 76, such as a pocket 76, for storing a predetermined plurality of product discount or rebate coupons. The pocket 76 may be of a rigid of flexible construction.

The present invention also contemplates that the accessory supporting means 70 may include a generally cylindrical pocket 78 for securely holding a beverage (not shown). Preferably, the beverage holder 78 is positioned external to one end of the elongated member 62 and such mobile push cart 2 for ease of handling the beverage (not shown). The cylindrical pocket 78 may be of a rigid of flexible construction and may includes apertures to reduce material consumption.

It will be appreciated that such accessory supporting means 70 are formed integral with the elongated member 62, although it will be apparent to those skilled in the art that the accessory supporting means 70 may be attached to the elongated member 62 by way of adhesives or fasteners, and particularly fasteners of a releasable type.

Furthermore, the elongated member 62 may be molded in a predetermined shape which will be advantageous for use for advertising purposes. For example, well known mouse ears may be incorporated into the cover 60 for use at Disney amusement parks.

The cover 60 may be further adapted with a seat cover portion 80 which is attached to the elongated member 62, for example by way of straps 82, and which is adapted for covering a bottom of a shopping cart child seat 6.

According to a further embodiment of the invention, best shown in FIG. 6, there is provided a protective cover, generally designated as 90, for a handle 4 on at least one of a mobile push cart 2 and a basket (not shown). Such cover 90 includes a tubular member 92 having a predetermined length and manufactured from a predetermined material. The tubular member 92 has an axial aperture 94 that extends between opposed ends thereof and a longitudinal slit 96 which continuously extends from the aperture 94 to an outer surface 98 of the tubular member 92. The tubular member 92 is detachably secured onto such handle 4 by positioning the longitudinal slit 94 adjacent such handle 4 and exerting pressure onto the tubular member 92 causing a temporary deformation of the tubular member 92 and enabling the longitudinal aperture 94 to encase such handle 4. The presently preferred material of the elongated member 92 is. a foam rubber, although any other material with similar properties may be used in its manufacture.

The cover 90 further includes a generally planar sheet 98 of a preselected flexible material which is sized to completely cover the tubular member 92. The presently preferred material of such planar sheet 98 is a washable fabric, although any other material with similar properties may be used in its manufacture.

Means, generally designated as 100, is provided for detachably securing the planar sheet 98 to the tubular member 92. Such securing means 100 includes at least one clamp means 102 having a partially flexible C-shaped portion 104 which is capable of temporarily deforming during positioning thereof onto the planar sheet 99 being wrapped around such handle 4 and which is further capable of applying a predetermined pressure to retain the planar sheet 99 on such handle 4 when the clamp means 102 is installed.

Alternatively, the securing means 100 may include a releaseable fastener means 106, for example such as a well known hook and loop fastener, best shown in FIG. 2. At least one first half 108 of a mating hook and loop fastener means 106 is attached to one side of the planar sheet 99 adjacent to an outer edge thereof and at least one opposed second half 110 is attached to an opposed side of the planar sheet 99. Those skilled in the art will understand that other types of releasable fasteners such as snaps and the like as well as removable adhesives may be employed in the present invention for securing the planar sheet 99.

Although the present invention has been shown in terms of the mobile push cart of the shopping cart type, it will be apparent to those skilled in the art, that the present invention may be applied to other types of the mobile push cart such as mail cart, stroller and the like.

Furthermore, various cover constructions disclosed in U.S. Pat. No. 5,722,672 issued to Frederick, U.S. Pat. No. 6,543,794 issued to Tyree and U.S. Pat. No. 6,065,764 issued to Moseley are suitable for use with the present invention, particularly for advertising product or event. The teachings of U.S. Pat. No. 5,722,672; U.S. Pat. No. 6,543,794; and U.S. Pat. No. 6,065,764 are incorporated into this document by reference thereto.

Thus, the present invention has been described in such full, clear, concise and exact terms as to enable any person skilled in the art to which it pertains to make and use the same. It will be understood that variations, modifications, equivalents and substitutions for components of the specifically described embodiments of the invention may be made by those skilled in the art without departing from the spirit and scope of the invention as set forth in the appended claims.

The invention claimed is:

1. In combination with a mobile push cart a cover for a handle on said mobile push cart, said cover comprising:
   (a) an elongated member sized to cover said handle; and
   (b) an accessory support member including at least one of:
      i. a rigid member having each of a generally planar surface and a proximal end thereof being one of formed integral with and attached to an exterior surface of said elongated member, said support member inclined at a predetermined angle toward a main compartment of said mobile push cart so that its distal end is disposed above said cover being installed onto said cover,
      ii. a generally rectangular pocket disposed on said exterior surface of said cover and having an open top end thereof disposed generally level with said handle when said cover is installed thereonto, and
      iii. a generally cylindrical pocket for securely holding a beverage, said pocket having each of a closed bottom end and an open top end.

2. The cover, according to claim 1, wherein said rigid member includes a reinforcing rib disposed in a vertical plane.

3. The cover, according to claim 1, wherein said cover further includes a pad of paper affixed to said generally planar surface of said rigid member.

4. The cover, according to claim 1, wherein said generally rectangular pocket has each of a closed bottom end and a front wall spaced from said exterior surface of said cover.

5. The cover, according to claim 1, wherein said generally cylindrical pocket is one of a rigid and flexible.

6. The cover, according to claim 1, wherein said generally cylindrical pocket is positioned at one end of said elongated member and said mobile push cart.

7. The cover, according to claim 1, wherein said cover further includes a seat cover portion attached to said elongated member and which is adapted for covering a bottom of a shopping cart child seat.

8. The cover, according to claim 1, wherein said generally rectangular pocket is one of a rigid and flexible.

\* \* \* \* \*